United States Patent [19]

Henderson et al.

[11] 3,998,459
[45] Dec. 21, 1976

[54] ELECTRICAL SHOCKING DEVICE

[75] Inventors: Gary A. Henderson; Douglas K. Dubuque, both of Lynnwood, Wash.

[73] Assignee: American Home Products Corporation, New York, N.Y.

[22] Filed: Feb. 10, 1975

[21] Appl. No.: 548,590

[52] U.S. Cl. .............................. 273/84; 231/2 E; 317/262 S
[51] Int. Cl.² ...................................... F41B 15/04
[58] Field of Search ............... 273/84 ES; 231/2 E; 317/262 S; 128/303.18, 404, 405, 419 R, 419 S, 420; 331/112

[56] References Cited

UNITED STATES PATENTS

| 1,210,112 | 12/1916 | Smith | 273/84 X |
|---|---|---|---|
| 2,204,041 | 6/1940 | Jefferson | 231/2 E |
| 2,208,852 | 7/1940 | Morgan | 273/84 X |
| 2,253,315 | 8/1941 | Andrus | 273/84 ES X |
| 2,484,147 | 10/1949 | Bartel | 231/2 E |
| 2,981,465 | 4/1961 | Bartel | 273/84 ES X |
| 3,362,711 | 1/1968 | Larsen et al. | 273/84 |
| 3,484,665 | 12/1969 | Mountjoy et al. | 317/262 S |
| 3,625,222 | 12/1971 | Shimizu | 273/84 X |
| 3,626,626 | 12/1971 | Blanc | 273/84 X |
| 3,713,580 | 1/1973 | Mickleson | 231/2 E |
| 3,819,108 | 6/1974 | Jordan | 273/84 X |
| 3,885,733 | 5/1975 | Klebold et al. | 231/2 E |
| 3,917,268 | 11/1975 | Tingey et al. | 273/84 |

FOREIGN PATENTS OR APPLICATIONS

| 767,898 | 5/1934 | France | 273/84 |
|---|---|---|---|
| 624,464 | 6/1949 | United Kingdom | 273/84 |
| 211,208 | 4/1968 | U.S.S.R. | 231/2 E |

*Primary Examiner*—Richard J. Apley
*Attorney, Agent, or Firm*—Joseph Martin Weigman

[57] ABSTRACT

An electrical shocking device includes a manipulatable, preferably tubular, housing, one end of which is open and provided with a flange. A plastic tube is movably positioned within the housing against the flange. The plastic tube contains an electric circuit, including a spark gap and circuit members for converting a low direct voltage into a very high voltage, storing a high voltage charge and intermittently discharging the storage device. A pair of probes extend outwardly from the tube beyond the flange, those ends of the probes within the tube being connected to opposite ends of a charge-storing capacitor through a spark gap in series with one of the probes. Batteries and a switch are provided within the housing for supplying the low direct voltage to the circuit upon movement of the tube in response to force on the probes.

6 Claims, 4 Drawing Figures

U.S. Patent  Dec. 21, 1976  3,998,459
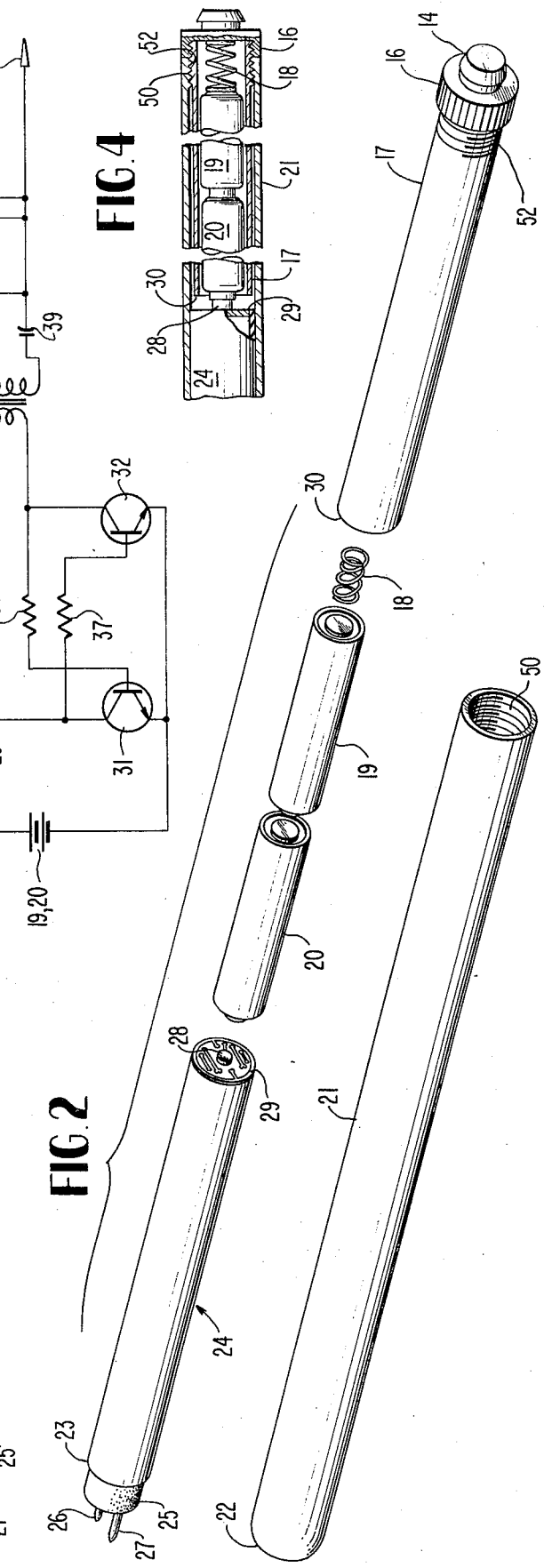
FIG. 1
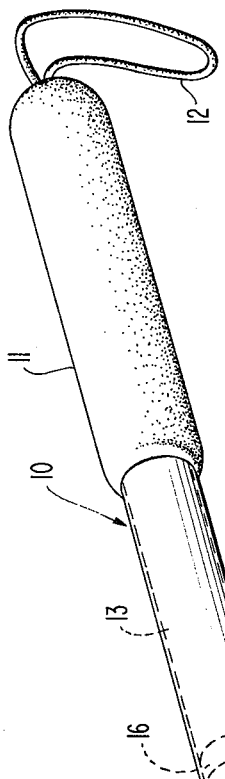
FIG. 2
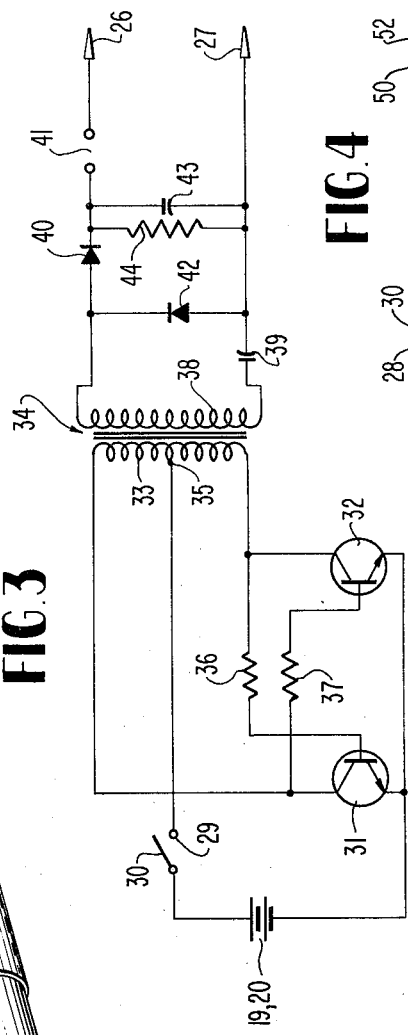
FIG. 3
FIG. 4

3,998,459

ELECTRICAL SHOCKING DEVICE

BACKGROUND OF THE INVENTION

The invention relates generally to shocking devices for livestock and people. More particularly, it is useful for training and controlling people and all kinds of animals.

The use of electrical shocking devices is widespread, reliable shocking devices being recognized as being a humane technique for handling livestock and people by many veterinarians, humane societies, medical personnel and law enforcement officers. Livestock prods are recognized as providing an effective and efficient technique for moving and training animals by many ranchers, farmers, meat packers and animal trainers. Electrical shocking devices for people are useful and accepted by behavior modification laboratories and many law enforcement people for training and controlling people and for personal protection. Shocking devices are commonly used in medical and psychiatric therapy.

Although electrical shocking devices have been in use for many years, they have not achieved optimum satisfaction.

It is known, for example, from the U.S. Pat. No. 2,981,465 to provide an electrical livestock prod with a pair of probes, adapted to contact the hide or skin of an animal, voltage to the probes being supplied from a transformer, which has its primary winding connected to a battery via make-and-break contacts. An electromagnetic relay is provided for effecting movement of the contacts. Such an arrangement has a number of drawbacks. The electromagnetic relay requires a core of considerable size and weight, as well as an energizing current source of substantial volume. The contacts too, tend to pit, wear out, become easily fouled with dirt and dust, and must be regularly adjusted. Such devices are easily damaged by shock and moisture and usually have short battery life.

Other electrical livestock prods are known which include a pair of probes for supplying electric shocks to an animal, voltages to the probes being supplied via a transformer which has its primary winding connected to a blocking oscillator. These known prods have the disadvantage of requiring a relatively large transformer, suffer from low output current which produces shock levels insufficient for control or training. These devices require a direct current source of considerable volume and are usually large and clumsy to handle and store.

SUMMARY OF THE INVENTION

It is an object of the present invention to provide a reliable shocking device which does not require any make-and-break contacts, except the switch.

It is another object of the present invention to provide a shocking device which is both compact and light.

It is a further object of the present invention to provide a shocking device which uses a transformer of extremely small size.

It is an additional object of the present invention to provide a shocking device which is free of any electromagnetic relay.

It is yet another object of the present invention to provide a shocking device which can operate effectively for long periods of time on two 1.5-volt size AA batteries, larger C and D batteries being unnecessary.

It is an additional object of the present invention to provide a switch which is rugged and reliable.

It is still a further object of the present invention to provide a shocking device which is sufficiently slim to be easily used in close quarters, such as in cattle chutes and the like.

It is yet a further object to provide a shocking device which has its main electrical circuit components housed within a closed tube and therefore free from the effects of moisture, dust, dirt and other contaminants.

The foregoing objects are achieved, in accordance with the present invention, by providing an electrical shocking device which includes a housing means within which there is a direct voltage source, preferably two 1.5-volt power cells, a switch means and a circuit for producing a high, direct voltage from the direct low voltage source, which circuit feeds the produced high voltage intermittently to a pair of electrical probes which are adapted to be placed against the hide or skin of an animal or person. The animal or person is subjected to a series of high voltage, low current electrical shocks so long as the probes contact the animal or person and the switch for activating the electrical circuit is closed. The circuit includes a free-running multivibrator, a step-up transformer, a rectifier and a spark gap.

A voltage multiplier can be associated with the rectifier.

Fixed length or telescoping extension handles may be attached to the shocking device for applying the shock from some distance.

BRIEF DESCRIPTION OF THE DRAWING

FIG. 1 is a pictorial view of an assembled electrical shocking device including a housing according to an exemplary embodiment of the present invention with an extension handle attached;

FIG. 2 is a somewhat enlarged, exploded pictorial view of the electrical shocking device of FIG. 1, the handle member not being shown;

FIG. 3 is a schematic diagram of the electrical circuit which is housed within the housing of FIG. 1, and FIG. 4 is an elongated sectional view of the apparatus of FIG. 3 in assembled form.

DETAILED DESCRIPTION OF THE PREFERRED EMBODIMENT

Referring to FIGS. 1 and 2, an illustrative shocking device according to the present invention is provided with a handle, generally designated by the numeral 10, having a heavy duty hand grip 11 and a wrist thong 12. Thr grip 11 can be made of rubber. The handle 10 includes a non-telescoping extension 13, which is provided, at its free end, with a conventional female connection well (not visible) which fits over and receives corresponding cooperating knob-like connection member 14, shown in FIG. 2. It is to be appreciated that telescoping extensions and/or extensions of varying lengths can be used in place of the extension 13.

The male connection member 14 is provided on knurled cap 16 secured to an end of an electrically conductive tubular member 17. Cap 16 is of somewhat greater diameter than the tubular member 17, as can be seen in FIG. 2. A part of the exterior of the portion 17 is provided with threads, and cap 16 is mated thereto.

Fixedly positioned to the closed interior end of the tubular member 17 is a spiral spring 18 and two AA size 1.5 volt alkaline or equivalent power cells 19 and 20 which are positioned end-to-end so as to dispose the bottom of the cell 19 on the spring 18. When assembled, the power cells 19 and 20 are within the tubular member 17.

The outer diameter of the tubular member 17 is slightly smaller than the inner diameter of a tubular casing member 21 which is provided with internal threads 50 at one end which cooperate with the external threads 52 on the tubular member 17, allowing the latter to be placed within the tubular member 21 and the two portions to be threaded together to complete the assembly.

The free end of the tubular member 21 is provided with a radially inward facing flange 22, against which a corresponding bearing surface 23 of plastic tube 24 rests when this plastic tube is movably positioned within the tubular member 21. The plastic tube 24 is provided with an end portion 25 which extends beyond the flange 22. Extending outwardly and longitudinally from that end of the plastic tube 24, which projects beyond the flange 22, is a pair of spaced-apart probes 26 and 27 adapted to be pressed against the skin or hide of an animal or person in order to give the animal or person a distinct, yet harmless, electric shock. The probes 26 and 27 are part of an electronic circuit, housed principally within the plastic tube 24. The details of the circuit are to be described hereinafter.

The end of the plastic tube 24, opposite that end from which the probes 26 and 27 project, is provided with an electrically conductive center contact 28 and an electrically conductive rim or ring 29. The center contact 28, when the prod is assembled, rests against the center post which constitutes one electrode of the cell 20, these members being held in contact by action of the spiral spring 18 upon which the bottom of the cell 19 rests. The conductive rim 29 on the plastic tube 24 is spaced apart from a rim 30 of the tubular member 17. The rim 30 is electrically connected through the tubular member 17 and the spring 18 to the second electrode of the cell 19 which is connected electrically in series with the cell 20.

In the absence of a force acting longitudinally on the probes 26 and 27, the spring 18 holds the bearing surface 23 of the plastic tube 24 in contact with the rim 22 of the tubular member 21. Upon application of force in a longitudinal direction on the probes 26 and 27, which would result by placing the probes 26 and 27 against the skin or hide of a person or animal sought to be handled or trained, spring 18 is compressed; the plastic tube 24 moves longitudinally within the tubular member 21; the conductive rim 29 touches the rim 30 of the tubular member 17 and the circuit is closed. As a result, current from the cells 19 and 20 is provided to the circuit components within the plastic tube 24.

As shown in the schematic diagram of FIG. 3, the cells 19 and 20 are connected, via the switch constituted by the rim 29 and the rim 30 across the emitter and the collector electrodes of a pair of transistors 31 and 32. The emitters are connected directly to one terminal of the three-volt direct voltage source constituted by the cells 19 and 20. The collectors of the respective power transistors are connected to opposite ends of a center tapped primary winding 33 of a step-up transformer 34, which has its center tap 35 conductively fixedly connected to the conductive center pin 28 and through the switch to the other terminal of the three-volt direct power source constituted by cells 19 and 20.

The base electrode of the power transistor 32 is connected to the collector of the power transistor 31 via a series-connected resistor 37. The base electrode of the power transistor 31 is connected to the collector electrode of the power transistor 32 via a series-connected resistor 36. The two transistors 31 and 32 thus connected constitute a free running multivibrator, which is activated by closing the switch constituted by the rims 29 and 30.

The step-up transformer 34 has a secondary winding 38 having two end terminals, one of these end terminals being connected to the probe 27 via a series-connected capacitor 39. The other end terminal of the secondary winding 38 is connected to the probe 26 via a series circuit constituted by a rectifying diode 40 and a spark gap 41, the cathode of the diode 40 being connected to one terminal of the spark gap 41. As illustrated, a second diode 42 is connected between the anode of the diode 40 and that terminal of the capacitor 39 which is connected to the probe 27, the cathode of the diode 42 being connected to the anode of the diode 40. A charge capacitor 43 is connected between the cathode of the diode 40 and the anode of the diode 42. A bleeder resistor 44 is connected in parallel with the charge capacitor 43 to assure that a high voltage charge is not stored in capacitor 43 for any appreciable time after use.

The capacitor 39 and the diode 42 constitute a voltage multiplier stage which, with the rectifier diode 40 and the charge capacitor 43, produces a direct voltage output to the probes 26 and 27 of about 1.414 greater than would be produced were the capacitor 39 and the diode 42 not used. It is to be appreciated that in some embodiments the capacitor 39 and the diode 42 need not be used and, in still others, additional stages of voltage multipliers may be used.

In an operative embodiment of the present invention, each of power cells 19 and 20 is a 1.5-volt alkaline power cell, size AA. Each of the diodes 40 and 42 is an IN 4007 semi-conductive device, rated at one ampere, and each of the power transistors 31 and 32 is a transistor manufactured under the number MJE520 by Motorola. The bleeder resistor 44 is a 2.2 megohm resistor, while each of the resistors 36 and 37 is a 10 ohm, one-quarter watt resistor. The capacitors 39 and 43 are each a 0.036 uf, 600-volt capacitor. The transformer 34 has a small, lightweight ferrite core having three legs, the primary and secondary windings being wound on the center leg.

A practical embodiment of the electrical shocking device without an extension 13 may be about 10 inches long and about three-quarters of an inch in diameter. The weight may be about 4.5 ounces. The device may be readily carried in a belt holster. The member 17 is desirably made of anodized aluminum. Member 21 may be made of anodized aluminum or of a less expensive plastic.

In operation, an operator simply places the probes 26 and 27 against the hide or skin of an animal and pushes, causing the plastic tube 24 to move axially backward within the tubular member 21 against the forward biasing force provided by the spring 18. As a result, the rim 29 contacts the rim 30 which activates the free-running multivibrator constituted, in part, by the transistors 31 and 32. Current flows alternatingly through the upper and lower portions of the primary winding 33 of the transformer 34 to its center tap 35, producing a stepped-up voltage on the secondary winding 38 of the transformer 34. The voltage from the secondary is multiplied and rectified by the circuit arrangement constituted by the diodes 40 and 42 and the capacitors 39 and 43, the rectified voltage producing a charge stored in the capacitor 43. When the voltage across the capacitor 43 is sufficiently high, the spark gap 41 fires, discharging the capacitor 43 and causing a short duration, high voltage, low current electrical shock to the animal or person against which the probes 26 and 27 were placed. Repeated charging and discharging of capacitor 43 through the probes causes a series of shocks to be applied to the animal or person so long as the rims 29 and 30 are in contact. The intermittent discharging provides effective shocking from a low power input, thereby greatly increasing the life of the batteries.

It is to be appreciated that the illustrated and described embodiment has been set out by way of example, not by way of limitation. Numerous variants and other embodiments are possible within the spirit and scope of the invention, the scope being defined by the appended claims.

What is claimed is:
1. A manipulable electrical shocking device comprising in combination:
 a. a housing;
 b. a pair of electrically conductive probes for delivering a series of short duration, high voltage, low current electrical shocks to objects in contact with said probes;
 c. a hollow tubular member positioned within said housing, said pair of probes being mounted in said tubular member and extending beyond said tubular member and said housing;
 d. a low direct voltage power source positioned within said housing; and
 e. an electronic circuit means for converting low direct voltage to high direct voltage coupled intermittently to said pair of probes and said power source, said circuit means including:
  i. oscillator means positioned within said tubular member for producing an alternating current output;
  ii. a step-up transformer positioned within said tubular member and having its primary winding coupled to receive the alternating current output from said oscillator means for producing a high alternating voltage across its secondary winding;
  iii. rectifying means positioned within said tubular member for producing a high direct voltage output to the probes, said rectifying means including a rectifier and charge storage means coupled to said secondary winding for producing a direct voltage across said charge storage means, one end of said charge storage means being coupled to one of said probes;
  iv. spark gap means positioned within said tubular member for producing repeated pulses of high voltage shocking current, said spark gap means being connected in series between said charge storage means and the other of said probes, thereby providing a conductive path when said direct voltage across said charge storage means is high enough to assure effective shock to said objects in contact with said probes and automatically interrupting the current flow when the charge of said charge storage means is depleted; and
  v. switch means positioned within the housing for selectively energizing said oscillator means from said low direct voltage source.

2. An electrical shocking device according to claim 1 wherein said circuit means further include a bleeder resistor connected in parallel with said charge storage means.
3. An electrical shocking device according to claim 1 wherein said circuit means further include a voltage multiplier connected between said secondary winding and said rectifying means.
4. A manipulable electrical shocking device comprising in combination:
 a. a housing;
 b. a pair of electrically conductive probes for delivering a series of short duration, high voltage, low current electrical shocks to objects in contact with said probes;
 c. a hollow tubular member positioned within said housing, said pair of probes being mounted in said tubular member and extending beyond said tubular member and said housing;
 d. a low direct voltage power source positioned within said housing; and
 e. an electronic circuit means for converting low direct voltage to high direct voltage coupled intermittently to said pair of probes and said power source, said circuit means including:
  i. oscillator means positioned within said tubular member for producing an alternating current output;
  ii. a step-up transformer positioned within said tubular member and having its primary winding coupled to receive the alternating current output from said oscillator means for producing a high alternating voltage across its secondary winding;
  iii. rectifying means positioned within said tubular member for producing a high direct voltage output, said rectifying means including a rectifier and charge storage means coupled to said secondary winding for producing a direct voltage across said charge storage means, one end of said charge storage means being coupled to one of said probes;
  iv. spark gap means positioned within said tubular member for producing repeated pulses of high voltage shocking current, said spark gap means being connected in series between said charge storage means and the other of said probes, thereby providing a conductive path when said direct voltage across said charge storage means is high enough to assure effective shock to said objects in contact with said probes and automatically interrupting the current flow when the charge of said charge storage means is depleted; and
  v. switch means positioned within said housing for selectively energizing said oscillator means from said low direct voltage source.

5. A manipulable electrical shocking device comprising in combination:
 a. a housing;
 b. a pair of electrically conductive probes for delivering a series of short duration, high voltage, low current electrical shocks to objects in contact with said probes;
 c. a first tubular member positioned within said housing and having first and second electrical contacts, said pair of probes being mounted in said tubular member and extending beyond said tubular member and said housing;

d. mechanical biasing means adapted to conduct electricity positioned within said housing for providing a force applied to said first tubular member, said first tubular member and said mechanical biasing means being positioned within said housing such that said first tubular member has a limited axial movement therein against the force provided by said mechanical biasing means;

e. a second tubular member positioned within said housing containing a low direct voltage power source and being adapted to conduct electricity and being in electrical contact with said mechanical biasing means and one of said first and second electrical contacts of said first tubular member, and being spaced apart from the other of said first and second electrical contacts of said first tubular member by said mechanical biasing means;

f. an electronic circuit means for converting low direct voltage to high direct voltage coupled intermittently to said pair of probes and said power source, said circuit means including:
  i. oscillator means positioned within said first tubular member for producing an alternating current output;
  ii. a step-up transformer positioned within said first tubular member and having its primary winding coupled to receive the alternating current output from said oscillator means for producing a high alternating voltage across its secondary winding;
  iii. rectifying means positioned within said first tubular member for producing a high direct voltage output, said rectifying means including a rectifier and charge storage means coupled to said secondary winding for producing a direct voltage across said charge storage means, one end of said charge storage means being coupled to one of said probes; and
  iv. spark gap means disposed within said first tubular member for producing repeated pulses of high voltage shocking current, said spark gap means being connected in series between said charge storage means and the other of said probes, thereby providing a conductive path when said direct voltage across said charge storage means is high enough to assure effective shock to said objects in contact with said probes and automatically interrupting the current flow when the charge of said charge storage means is depleted, whereby a force applied to said probes overcomes said biasing means and brings said second tubular member into contact with both of said first and second electrical contacts of said first tubular member thereby energizing said probes from said power source.

6. A manipulable electrical shocking device comprising in combination:
a. a housing;
b. a pair of electrically conductive probes for delivering a series of short duration, high voltage, low current electrical shocks to objects in contact with said probes;
c. a first tubular member having a conductive rim and a conductive center contact positioned within said housing, said pair of probes being mounted in said first tubular member and extending beyond said first tubular member and said housing;
d. mechanical biasing means made of electrical conducting material and positioned within said housing for providing a force applied to said first tubular member, said first tubular member and said mechanical biasing means being positioned such that said first tubular member has a limited axial movement therein against the force provided by said mechanical biasing means;
e. a second tubular member made of electrical conducting material and adapted to conduct electricity, fixedly positioned within said housing and adapted to contain low direct voltage power cells; and
f. an electronic circuit means for converting low direct voltage to high direct voltage coupled intermittently to said pair of probes and said power cells, said circuit means including:
  i. oscillator means positioned within said first tubular member for producing an alternating current output;
  ii. a step-up transformer positioned within said first tubular member and having its primary winding coupled to receive the alternating current output from said oscillator means for producing a high alternating voltage across its secondary winding;
  iii. rectifying means positioned within said first tubular member for producing a high direct voltage output, said rectifying means including a rectifier and charge storage means coupled to said secondary winding for producing a direct voltage across said charge storage means, one end of said charge storage means being coupled to one of said probes; and
  iv. spark gap means disposed within said first tubular member for producing repeated pulses of high voltage shocking current, said spark gap means being connected in series between said charge storage means and the other of said probes, thereby providing a conductive path when said direct voltage across said charge storage means is high enough to assure effective shock to said objects in contact with said probes and automatically interrupting the current flow when the charge of said charge storage means is depleted, whereby said mechanical biasing means normally maintains said conductive rim of said first tubular member in spaced apart relation to said second tubular member and whereby a force applied to said probes overcomes said mechanical biasing means and moves said conductive rim of said first tubular member into contact with said second tubular member thereby energizing said probes from said power source.

* * * * *